(12) United States Patent
Capps

(10) Patent No.: US 6,397,311 B1
(45) Date of Patent: May 28, 2002

(54) SYSTEM AND METHOD FOR DEFRAGMENTING A FILE SYSTEM

(75) Inventor: James A. Capps, Austin, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/445,592

(22) Filed: May 22, 1995

Related U.S. Application Data

(63) Continuation of application No. 07/467,604, filed on Jan. 19, 1990, now abandoned.

(51) Int. Cl.⁷ .............................................. G06F 12/08
(52) U.S. Cl. ........................... 711/165; 711/170; 709/1
(58) Field of Search ................................ 395/400, 425; 711/11, 1, 3, 4, 165, 170; 709/1

(56) References Cited

U.S. PATENT DOCUMENTS

| | | | | |
|---|---|---|---|---|
| 4,037,205 A | * | 7/1977 | Edelberg et al. ............. | 364/900 |
| 4,390,945 A | * | 6/1983 | Olsen et al. ................. | 364/200 |
| 4,742,447 A | * | 5/1988 | Duvall et al. ............... | 364/200 |
| 4,761,737 A | * | 8/1988 | Duvall et al. ............... | 364/300 |
| 4,771,375 A | * | 9/1988 | Beglin et al. ............... | 364/200 |
| 4,821,185 A | * | 4/1989 | Esposito ..................... | 364/200 |
| 4,833,604 A | * | 5/1989 | Cheng et al. ................ | 364/200 |
| 4,907,151 A | * | 3/1990 | Bartlett ....................... | 364/200 |
| 4,959,771 A | * | 9/1990 | Ardini, Jr. et al. .......... | 364/200 |
| 5,021,946 A | * | 6/1991 | Korty .......................... | 364/200 |
| 5,276,867 A | * | 1/1994 | Kenley et al. ............... | 395/600 |
| 5,287,504 A | * | 2/1994 | Carpenter et al. ........... | 395/600 |
| 5,398,142 A | * | 3/1995 | Davy ........................... | 360/48 |

OTHER PUBLICATIONS

McDonald et al, Improving File System Performance by Dynamically Restructuring Disk Space, Computers and Comm., 1989 Int'l Phoenix Conf.*

* cited by examiner

Primary Examiner—Majid Banankhah
(74) Attorney, Agent, or Firm—W. Daniel Swayze, Jr.; W. James Brady; Frederick J. Telecky, Jr.

(57) ABSTRACT

A system and method of defragmenting a file system is described which includes the steps of building a block descriptor array and reading a portion of the file system to a section of RAM creating new free space within the file system. The file blocks from the RAM are then written to free space within the file system. The pointers identifying the file blocks are then repaired on the disk. Files are then retrieved into the section of RAM for contiguous placement in the newly created free space within the file system. These files are then placed in contiguous manner into the new free space and the pointers identifying these files are repaired on the disk. The method of the present invention uses several optimization techniques and is designed such that it is secure from power loss during the defragmentation process.

8 Claims, 3 Drawing Sheets

SYSTEM AND METHOD FOR DEFRAGMENTING A FILE SYSTEM

This application is a Continuation of application Ser. No. 07/467,604, filed Jan. 19, 1990 now abandoned.

TECHNICAL FIELD OF THE INVENTION

This invention relates in general to computers and more particularly the present invention relates to a system and method for defragmenting a file system.

BACKGROUND OF THE INVENTION

As files are created and deleted in a file system such as, for example, a file system created in the UNIX operating system, the files and the free space on the disk space become fragmented. This fragmentation means that an individual file does not reside in a contiguous region of the disk but rather is broken up into many pieces of the disk. When a program tries to access a fragmented file, additional movement of the disk read/write head to another location on the disk is required, resulting in reduced performance.

The defragmentation process rearranges the file segments and free space on the disk so that each file resides in a contiguous region on the disk. There are two common methods for defragmenting a UNIX file system. The first of these methods comprises copying all of the files to another medium, such as a tape drive. After the files are copied, they are then deleted from the file system. A standard utility program may then be run to rebuild the list of free space on the disk. The files are then copied back onto the file system such that each file resides in contiguous regions of the disk space. This method is effective, but has several important drawbacks. If a tape drive is used, the method is cumbersome as it requires a person to be present to handle the tapes if the files in the file system will not all fit on one tape. If a disk is used for the intermediate storage medium, the method is faster and can be automated so that no person's presence is required. However, this is an extremely expensive solution as it requires a large amount of free space on the disk used as the intermediate storage medium.

The second method concentrates on one file at a time and rearranges the disk until that file resides in contiguous regions of the disk. This method does not require an intermediate storage medium such as the previous method, but is itself rather slow because of the extensive data movement required.

Therefore, a need has arisen for a system and method for defragmenting a file system which does not require a separate tape drive or disk for an intermediate storage medium but which efficiently rearranges the file blocks in the file system such that they reside in contiguous regions of the disk space. A further need has arisen for a system and method for defragmenting a file system which is secure in that loss of power during the defragmentation process will not result in loss of data integrity.

SUMMARY OF THE INVENTION

In accordance with the present invention, a method for defragmenting a file system is provided which substantially eliminates or reduces disadvantages associated with prior systems and methods. A first contiguous portion of the file system comprising a first plurality of blocks is read into a storage circuit. The first plurality of blocks is then written into free space within the file system. A second plurality of blocks for contiguous placement in the file system is then read from the file system into the storage circuit. The second plurality of blocks is then written into the first contiguous portion of the file system. These steps are repeated until the entire file system is defragmented.

In accordance with another aspect of the method of the present invention, a block descriptor array is created which contains information identifying the location of each pointer to each block within the file system. This block descriptor array is maintained as blocks containing pointers are moved during the defragmentation process. In this manner, the system and method of the present invention always has access to a map of the entire file system.

In accordance with another aspect of the present invention, an inode cache circuit and an indirect cache circuit are used to store inode blocks and indirect blocks which contain more than one pointer which must be updated during a single cycle during the defragmentation process. In this manner, multiple pointers can be repaired in memory prior to writing the entire inode or indirect block onto the disk. Accordingly, multiple write cycles are saved and the method of the present invention proceeds more quickly.

An important technical advantage of the present invention inheres in the fact that data blocks or indirect blocks are always written to the disk space prior to the alteration of the pointers pointing to those blocks. In this manner, the method of the present invention is secure from possible power failure during the defragmentation process.

BRIEF DESCRIPTION OF THE DRAWINGS

A more complete understanding of the present invention may be acquired by referring to the detailed description and claims when considered in connection with the accompanying drawings in which like reference numbers indicate like features and wherein:

FIG. 3 is a diagram which illustrates the operation of the defragmentation process.

DETAILED DESCRIPTION OF THE INVENTION

In order to understand the defragmentation process of the present invention, it is first important to examine the organization of a file system such as is ordinarily used in, for example, the standard UNIX operating system. While the system and method of the present invention will be described herein with reference to a file system configured under the UNIX operating system, it should be understood that the system and method of the present invention may be equally applicable, with minor modifications, to other operating systems requiring the defragmentation process described herein.

Figure 1:
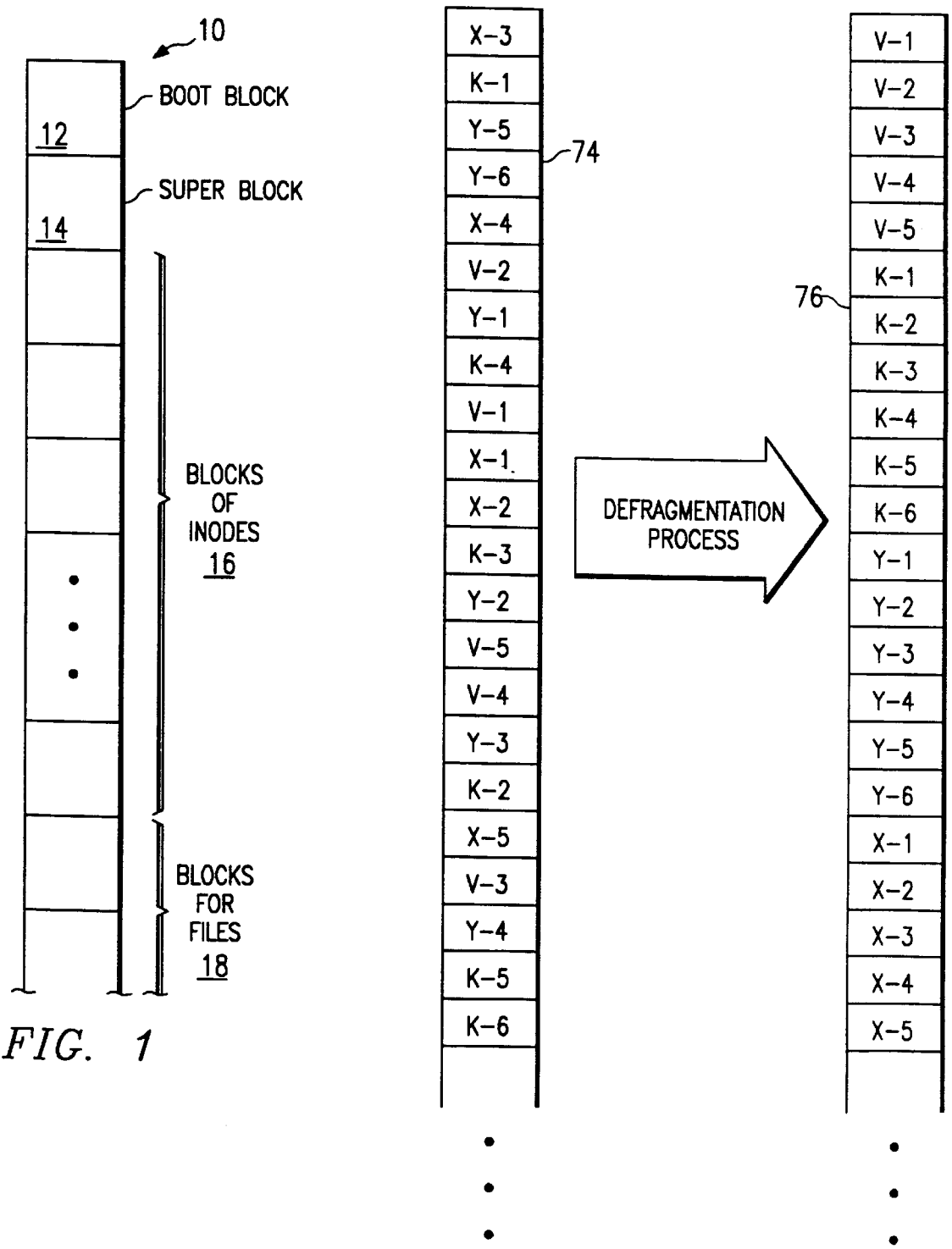
FIG. 1 is a diagram illustrating the conventional organization of a UNIX file system.

FIG. 1 illustrates the organization of a UNIX file system. Referring to FIG. 1, a file system indicated generally at 10 comprises a boot block 12. It should be understood that the representation of file system 10 in blocks is intended to illustrate the relative placement of blocks of information on a disk storage system used in an integrated UNIX-based processing system. A super block 14 is placed contiguous to boot block 12 in file system 10. Boot block 12 comprises information necessary to boot the file system 10 and super block 14 comprises information such as the number of inode blocks in the file system and the anchor address for the linked list of free blocks within the file system.

A number of blocks indicated generally at 16 which contain the inodes for the file system reside in the file system contiguous to super block 14. There could be any number of inode blocks 16 in the file system depending upon how many inodes are required for file system 10. The remaining blocks in the file system, indicated generally at 18, are used for the storage of data and as indirect blocks to access further data within the file system.

According to one configuration of a UNIX file system, each block corresponds to one kilobyte of data storage space. According to this configuration, sixteen inodes may be stored within a single kilobyte block. According to this implementation, each inode is sixty-four bytes long.

The remaining blocks 18 are used for data storage, each block storing one kilobyte of information. The size of each block is a selectable feature under the UNIX operating system and may be, for example, 256 bytes, 1 kilobyte or 4 kilobytes in size per block according to the needs of a particular application. The method and system for defragmentation of the present invention is equally applicable to any of these selectable block sizes.

Figure 2:
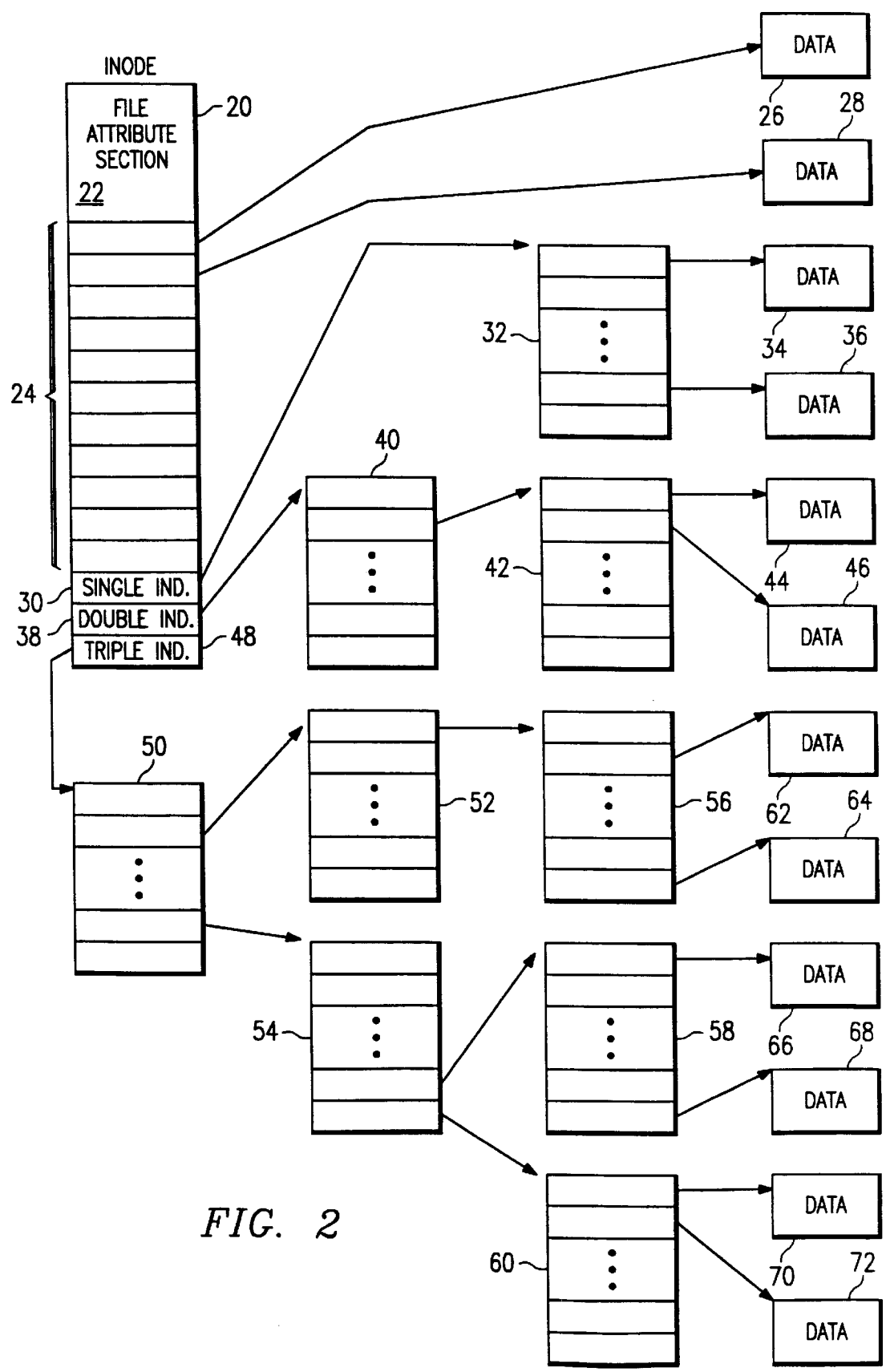
FIG. 2 is a diagram further illustrating the conventional organization of a UNIX file system including the organization of a single inode block.

FIG. 2 is a block diagram which illustrates the method used under the UNIX operating system for mapping the locations of data blocks within any single file using inodes and indirect blocks. A single inode 20 is shown in FIG. 2 to comprise a file attribute section 22 which comprises information as to the owner of the file, the size of the file and security access provisions. In the UNIX operating system, the file attribute section 22 does not comprise the name of the file identified by inode 20. The remaining sections of inode 20 each hold a thirty-two bit pointer which individually identify other one kilobyte blocks within the file system. The first ten sections of inode 20, indicated generally at 24, contain pointers which directly identify data blocks such as data block 26 and 28 shown in FIG. 2. Data blocks 26 and 28 both contain one kilobyte portions of a file identified by inode 20. In this manner, a single inode such as inode 20 can directly point to up to ten one-kilobyte blocks of data. If a file is larger in size than ten kilobytes, the UNIX operating system uses single indirect blocks to point to more one kilobyte data blocks to complete the storage of the file.

For example, in FIG. 2, a segment 30 of inode 20 contains a thirty-two bit pointer which indicates a single indirect block 32. Single indirect block 32 may store up to 256 thirty-two bit pointers which may each indicate an additional one kilobyte block of data such as data blocks 34 and 36 shown in FIG. 2. In this manner, an inode such as inode 20 may, through the use of pointers stored in sections 24 and a single indirect block such as single indirect block 32, indicate the location of up to 256 one kilobyte data blocks.

If a file is larger than 266 kilobytes in size, the UNIX operating system provides for the use of double indirect blocks. A double indirect pointer is stored in a segment 38 within inode 20. This thirty-two bit double indirect pointer identifies a one kilobyte block 40 which contains up to 256 thirty-two bit pointers. Each of these 256 thirty-two bit pointers may identify a further one kilobyte block such as block 42. Block 42 may store up to 256 thirty-two bit pointers. Each of the thirty-two bit pointers stored in block 42 may identify a single one kilobyte block of data such as data blocks 44 and 46 shown in FIG. 2. In this manner, through the use of the double indirect pointer stored in section 38, the inode 20 can identify 65,536 additional one kilobyte blocks of data.

If the file exceeds the amount of storage space identifiable using the sections 24 or the single indirect block or double indirect blocks, the UNIX operating system provides for the use of triple indirect blocks. A section 48 within inode 20 identifies a triple indirect block 50. Triple indirect block 50 may store up to 256 thirty-two bit pointers which each identify further one kilobyte blocks such as blocks 52 and 54. Blocks 52 and 54 may store up to 256 thirty-two bit pointers which each identify single one kilobyte blocks such as blocks 56, 58 and 60. Finally, blocks 56, 58 and 60 may store up to 256 thirty-two bit pointers which identify the actual one kilobyte data blocks such as data blocks 62, 64, 66, 68, 70 and 72 where the actual data for the file identified by inode 20 is stored. In this manner, the inode 20 can identify 16,777,216 additional one kilobyte data blocks in addition to those previously identified.

The structure presented above is merely exemplary of one standard UNIX configuration. It is presented for the purposes of showing an important consideration of defragmentation techniques including the defragmentation technique of the present invention. During the defragmentation process, the data blocks are moved within the file system to reside in contiguous regions of the disk. During this process, the pointers which identify the location of the specific data blocks must be updated. Because of the indirect block system used by the UNIX operating system, the pointers do not all reside within the section of the disk storing the blocks of inodes. A large number of the pointers reside in indirect blocks which are stored in the disk among the remaining data blocks. The system and method of defragmentation of the present invention uses optimization techniques which will be described herein to provide for the updating of the pointers wherever they reside in the file system in an efficient and secure manner.

Referring to FIG. 3, the defragmentation process is illustrated in schematic form. A file system 74 is shown in fragmented form. By way of example, file system 74 is shown to comprise files K, V, X and Y. Each of the files K, V, X and Y comprise a plurality of data blocks, each identified with an individual number. For example, file K comprises data blocks K-1, K-2, K-3, K-4, K-5 and K-6, each placed in a noncontiguous region of file system 74. Because of the fragmented nature of file system 74, if the file K were to be read, it would require the placement of the read head of the disk drive mechanism to be placed at five different locations on the disk. This is obviously a very slow process as compared to a defragmented structure such as is indicated by file system 76 where file K resides in a contiguous space in file system 76. In order to read file K from file system 76, the read head of the disk drive mechanism must only be placed at one location on the disk and all six blocks of the file can be read in one read operation.

Figure 4:
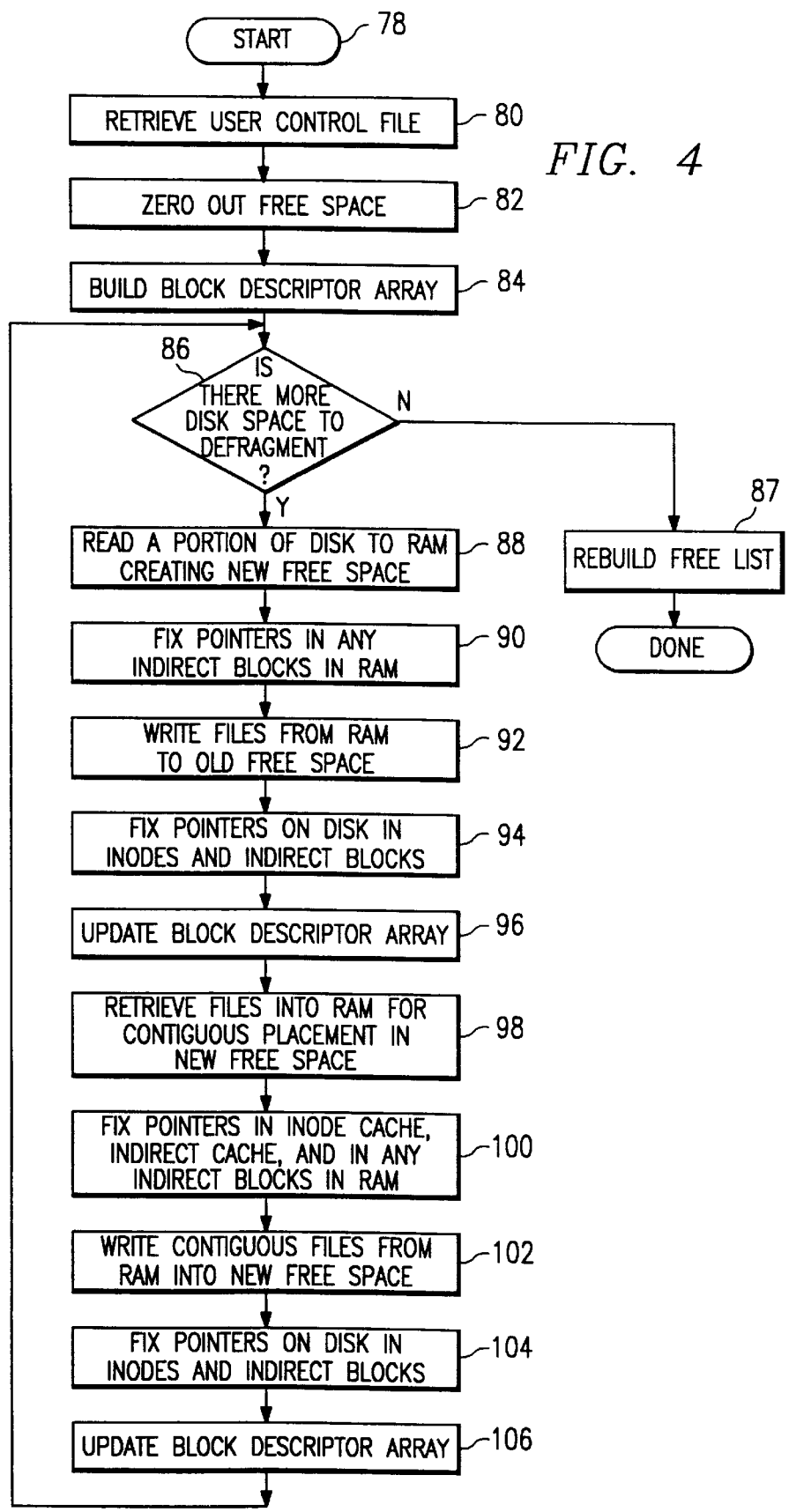
FIG. 4 is a flow chart illustrating the defragmentation process of the present invention.

FIG. 4 illustrates in flow chart form the method of defragmentation of the present invention. The method of the present invention begins at block 78 and proceeds to block 80 where a user control file is retrieved if it is present. This user control file is an optional feature of the system of the present invention where the user of the defragmentation program may select the order in which the files are placed in the defragmented file system.

It should be understood that the term "file system" is used as opposed to the term "disk" as a plurality of file systems may be resident on a single disk storage system. In most UNIX systems, file systems operate independently of one another even if they are on the same disk storage system and, therefore, it is only meaningful to speak of defragmenting a file system as opposed to an entire disk storage system. Further, although the defragmentation program of the present invention requires that no activity occur in the file system during the defragmentation process, other file systems on the disk storage system may be accessed and used during the defragmentation process by other applications.

Referring again to FIG. 4, the method of the present invention proceeds from block 80 to block 82 where the free space indicators within the super block of the file system to be defragmented are zeroed out for security reasons. If the power is lost during the defragmentation process, the file system would not have any record of any free space within the subject file system. In this manner, there is no way that a subsequent user of the system could overwrite data files which had been written into sections of the file system as no free space is available in the file system after the defragmentation process has begun. A separate data recovery could be used to reconstruct the free list of the file system.

The method of the present invention then proceeds from block 82 to block 84 where a block descriptor array is constructed in random access memory ("RAM") of computer 200. This block descriptor array may comprise, for example, four bytes per disk block within the file system. In order to construct the block descriptor array, each of the inodes and indirect blocks stored within the file system are read and a record of the location of the pointer to each of the one kilobyte blocks within the file system is created. In this manner, the entire file system is mapped in that the block descriptor array contains a record of where a pointer to each block within the system is located, whether it be within an inode block or within a single, double or triple indirect block. After its initial construction, the block descriptor array will be maintained throughout the defragmentation process as blocks are relocated within the file system.

The method of the present invention proceeds from block 84 to a decision block 86 where it is determined whether there is any more disk space within the file system to defragment. If there is no disk space remaining to defragment, the process proceeds to block 87 where the method concludes by rebuilding the free list in step 88. If there is more disk space within the file system to defragment, the method of the present invention proceeds to block 88 where a portion of the disk within the file system is read into a 127 kilobyte section of RAM. The exact size of the portion read is the minimum of the number of blocks of free space in the file system, the maximum number of blocks the disk controller can read or write in one operation, or the number of blocks in the file system remaining to be defragmented. A 127 block will be used herein as an example for purposes of teaching the present invention. This read step creates a 127-block section of new free space within the file system. As discussed previously, because of the structure of the UNIX file system, this 127-block section of the file system may contain data blocks containing actual data or may contain indirect blocks storing pointers to other data blocks comprising the file.

The method then proceeds to a block 90 where the pointers stored in any indirect blocks in the 127 blocks stored in RAM are fixed. Because the method of the present invention first constructed the block descriptor array in step 84, the information as to the location of all free space in the file system is available in the block descriptor array. Accordingly, the future location of the 127 blocks read from the portion of the file system is available through the use of the block descriptor array. Accordingly, the pointers to these blocks can be fixed in the indirect blocks prior to the writing of the 127 blocks to the old free space in the file system.

The method proceeds from block 90 to a block 92 where the 127 blocks are written from RAM to free space in the file system (not including the free space created by the step of block 88). The method then proceeds to a step 94 where the pointers in inodes and indirect blocks that are not in RAM are actually repaired within the file system on disk. For each of the 127 blocks that is pointed to directly by an inode or is pointed to by an indirect block that is not in RAM, the inode or indirect block is read, if necessary, into an inode cache or an indirect cache and the pointer is updated. When all blocks have been processed, the inode cache and the indirect cache are written to disk. The inode cache and the indirect cache may comprise, for example, sixteen kilobyte sections of RAM which are set aside to store inodes and indirect blocks such that multiple changes within these blocks can be performed prior to writing the inodes or indirect blocks back to the disk. In this manner, many write operations to the disk can be saved by fixing several pointers within a single inode or indirect block within memory and then writing the entire block to the disk in a single write operation.

An important technical advantage of the method of the present invention is apparent at this point. It should be noted that the 127 blocks are written to the old free space before the pointers are actually repaired on disk. In this manner, the method of the present invention is safe from inadvertent power failure during the defragmentation process. For example, if steps 92 and 94 were reversed such that the pointers were repaired on disk prior to the actual placement of the 127 blocks in the old free space, and power failure were to occur between the two steps, the pointers would be pointing to a portion of the disk which did not contain the portion of the file supposedly at that position. In comparison, according to the method of the present invention, if power failure were to occur between steps 92 and 94, the 127 blocks would exist both in the first 127 blocks of the file system where they originally were located and in the 127 blocks of free space located within the file system. Accordingly, the old pointers, not having been changed due to the power failure, would still be pointing to the old block locations which would still contain the appropriate portions of the file system. Accordingly, the method of the present invention is secure against power failure during the defragmentation process as file blocks are always written to the disk prior to the fixing on disk of pointers pointing to those file blocks.

The method proceeds from block 94 to a block 96 where the block descriptor array is updated to reflect the new location of the pointers to each of the 127 blocks which have been moved. The method then proceeds to a block 98 where the files to be placed in the new 127 blocks of free space within the file system are retrieved within the 127 kilobyte RAM section. As discussed previously, the user through the use of a control file may specify the order in which the files are to be placed within the defragmented file system. If this is the case, the user control file is consulted and the appropriate files are retrieved. According to one embodiment of the method of the present invention, if the user does not specify a particular order, the files are retrieved in the order that the inode blocks are resident within the inode block section of the file system. In either case, the appropriate blocks from the files are located and are read from the disk into the 127 kilobyte section of RAM. Which blocks are appropriate is determined by a subroutine which keeps track of which file is currently being moved and which block within the file was last moved into place. This subroutine returns an array of block numbers for the blocks of the file system which should be moved to the 127 kilobyte section of newly created free space. This array of block numbers may include blocks from several different files. Some of the block numbers may correspond to indirect, double indirect, or triple indirect blocks.

The method then proceeds to a step 100 where the pointers within the inode cache, the indirect cache and within any indirect blocks within the 127 kilobyte section of RAM are repaired in exactly the same manner as was described earlier with reference to step 90. As was described previously, this allows for the changing of pointers in memory as opposed to requiring multiple write operations to disk to repair pointers on disk.

The method then proceeds to a step 102 where the contiguous file or files stored in the 127 kilobyte section of RAM are written into the new 127 block free space within the file system. The method then proceeds to a block 104 where the pointers pointing to the contiguous files now resident in the 127 block region of the file system discussed previously, are repaired on disk whether they reside in inodes or indirect blocks. As discussed previously, the files are written into the 127 block area of free space prior to the repair of the pointers to those files for security reasons.

The method then proceeds to a step 106 where once again the block descriptor array is updated to reflect the new locations of the pointers to each block within the file system.

The method then returns to decision block 86 where it is determined whether there is more disk space within the file system to defragment. The method then repeats blocks 88 through 106 until there is no more disk space to defragment.

According to one implementation of the method of the present invention, a typically fragmented file system can be defragmented at a rate of approximately 200 megabytes of disk space per hour. This is compared to the rate of 100 megabytes per hour which is typical of the defragmentation methods which concentrate on a single file at a time.

The method of the present invention is aided by the fact that optimization techniques are used in several areas within the method. For example, if it is found that blocks of a file within the fragmented file system are by chance contiguous, a single read operation is used to read them from the file system to the RAM storage space. Similarly, when the files are written to the old free space in step 92 of the method, if the blocks of free space happen to be contiguous, a single write operation is used to write them to old free space. Further, once the file or files are contiguous within the 127 kilobyte section of RAM, only a single write operation is needed to place the entire 127 kilobyte block on the disk.

The method of the present invention also enjoys the speed advantages from the use of the two sixteen-kilobyte caches for the storage of inodes and indirect blocks which have multiple pointers to be changed within them. As described previously, the use of these caches allows for only a single write operation to be used to change any number of pointers within inode blocks or indirect blocks stored within the caches. Thus, the pointers may be repaired in memory as opposed to requiring a write cycle to disk for each pointer to be repaired.

Similarly, the pointers within the 127 blocks stored in RAM can be repaired as discussed previously with reference to step 90 by looking ahead to see where the free space within the file system resides. Once again, pointers may thus be repaired in memory and a single write operation can be used to repair the pointers on the disk.

A printout of pseudocode is included herein as Appendix A to illustrate in detail one possible embodiment of the method of the present invention. It should be understood that the pseudocode in Appendix A is included solely for purposes of teaching the present invention and should not be construed to limit the scope of the present invention to this or any particular embodiment.

It should be understood that the UNIX operating system used herein to describe the method of the present invention is a flexible system and a number of the parameters described with reference to the embodiment described herein could be altered without departing from the spirit of the method of the present invention. For example, the size of the 127 kilobyte RAM section described with reference to the embodiment described herein is solely a result of the ability of a single drive controller to perform only a 127 block write operation at one time. If another controller were used, a different size section of RAM would be appropriate. Although the present invention has been described in detail, it should be understood that these changes or other alterations or substitutions can be made hereto without departing from the spirit and scope of the invention as defined by the appended claims.

APPENDIX "A"

```
GLOBAL VARIABLES:
    blk_descpt_array        /* An array of structures -- one per disk block  */
                            /* in the file system, containing the following  */
                            /* fields:                                       */
        blk_type            /* type of block - free, data, or indirect blk   */
        par_type            /* type of parent- inode or indirect block       */
        parent              /* parent inode #/ block #                       */
        index               /* index into parent (tells where within the     */
                            /* parent is the block # of this block           */ first_blkno             /* Current 1st data block (of interest) on disk  */

Blksiz                  /* Size of a disk block in bytes                 */
    Nindir                  /* Number of daddr_t's in an indirect block      */
    max_num_blks            /* Max number of data blocks to read at once     */
    MXB                     /* Max number of blocks that the disk controller */
                            /* can read or write in one operation            */ inode_list[]            /* Array of inode numbers                        */
    current_inode_no_ptr    /* Ptr to current position in inode_list         */

/***********************************************************************/
/* The following are SOFTWARE CACHES and things to keep track of what is */
/* in those caches.  Care must be taken to ensure the integrity of these */
/* caches at all times.  An asterick preceding the name indicates a      */
/* pointer.  Brackets following the name indicate an array.              */
/***********************************************************************/
    *sinblk                 /* Ptr to buffer to hold a single ind block      */
    sinblkno                /* Block # of block in sinblk                    */
    *dinblk                 /* Ptr to buffer to hold a double ind block      */
    dinblkno                /* Block # of block in dinblk                    */
    *tinblk                 /* Ptr to buffer to hold a triple ind block      */
    tinblkno                /* Block # of block in tinblk                    */
    *input_buffer           /* Ptr to big buffer (max_num_blks blocks long)  */
    *output_buffer          /* Ptr to big buffer (max_num_blks blocks long)  */

*tmp_ind_blk[]          /*Ptrs to buffers to hold an indirect block */
    tmp_ind_blknos[]        /* Block #s of block in tmp_ind_blk         */

*inode_blk[]            /*Ptrs to bufs to hold blocks of inodes*/
    curr_inode_blknos[]     /*block #s where inode_blk[] came from*/
    inode_blk_changed[]     /*Flags: 1=inode_blk changed since read*/ dest_blknos[]           /* Array of destination block numbers            */
    desired_blknos[]        /* Array of desired     block numbers            */
    blknos_in_input_buf[]   /* Array of in memory   block numbers            */
    blk_changed_in_mem[]    /* Array of flags                                */ unpacked_blknos[13]     /* Array where blknos from an inode are put */
    curr_unpacked_inode_no  /* inode number currently unpacked */

/***********************************************************************/
/* In the following pseudo-code description of the algorithm, braces are */
/* used to indicate the beginning and ending of paragraphs of code.      */
/* Indentation is also used to improve readability.  Subroutine calls are*/
/* indicated with the verb 'call' and with parentheses following the name*/
/* of the subroutine.  Arguments, if any, are shown between the parens   */
/* with a comma used to separate arguments.                              */
/***********************************************************************/
```

```
MAIN ROUTINE:
{
        Call  initialize( name of raw disk partition for file system ).

If user has specified a control file then
                call  process_cntl_file( cntlfile ).

Call  build_blk_descriptor_array( ).

Zero the number of free blocks and the free list in the superblock.
        Write the superblock to disk.

While( not completely done )
        {
                Read next contiguous max_num_blks blocks starting at block
                        specified by first_blkno into the large input buffer.

Initialize blknos_in_input_buf array to indicate where
                        the blocks in the input buffer came from.

Call  get_blk_numbers_desired_next( max_num_blks ) and
                        set num_blks to number actually obtained.

If  num_blks = 0  break out of while loop (since all done.)

Call  get_destination_blknos( num_blks ).

If  get_destination_blknos() indicates chunk is changing
                {
                        Zero array of flags indicating none have changed yet.

Call  fix_indirect_blks_in_memory( num_blks,
                                                           input_buffer,
                                                           blknos_in_input_buf Call  write_to_destination_blocks( num_blks,
                                                           input_buffer ).

Call  fix_inodes_and_indirect_blks(num_blks,
                                                           input_buffer,
                                                           blknos_in_input_buf,
                                                           1 ).
                        Call  read_blks_desired_next( num_blks,
                                                     output_buffer).

Initialize array of destination block numbers to
                                block numbers for current chunk of disk.

Call  fix_indirect_blks_in_memory( num_blks,
                                                           output_buffer,
                                                           desired_blknos).

Write next contiguous num_blks blocks of disk starting
                                at block specified by first_blkno from memory
                                in large output buffer.

Call  fix_inodes_and_indirect_blks( num_blks,
                                                            output_buffer,
                                                            desired_blknos,
                                                            0 ).
                }
                Add  num_blks  to  first_blkno.
        }
        Call  cleanup().
}
```

```
fix_indirect_blks_in_memory( num_blks, buffer_addr , blknos_in_buf )
{
        For  each  of  the  num_blks  blocks  in  the  buffer
        {
                If  the  block  is  a  free block,  skip it.

If  the  block's  parent  is  an  indirect  block
                {
                        If  block's  parent  is  sinblk, dinblk, or tinblk
                        {
                                Fix up the parent's pointer (in sinblk,
                                        dinblk, or tinblk) to this block
                                        to new location for this block.
                        }
                        If  block's  parent  is  somewhere  in the buffer
                        {
                                set flag indicating that the block which
                                        contains the parent is changing.
                                change the parent block's pointer to this
                                        block to the new location for this
                                        block.
                        }
                }
        }
} fix_inodes_and_indirect_blks(num_blks, buffer_addr, blknos_in_buf, flag )
{
        For  each  of  the  num_blks  blocks  in  the  buffer
        {
                If  the  block  is  a  free block,  skip it.

If  the  block  is already where user wants it on disk, skip it

If  block's parent is an inode
                {
                        update_inode( parent_blkno, index_into_parent,
                                                        new_blkno_of_block ).
                }
                Else
                {
                        If block's parent is in the buffer, skip it (since
                                parent was updated earlier -- when we called
                                fix_indirect_blks_in_memory).
                        Call  read_tmp_ind_blk( parent_blkno ).
                        Fix parent to point to child's new location.
                }
        }
        For  each  of  the  num_blks  blocks  in  the  buffer
        {
                If  block  is  an  indirect  block
                {
                        If block is in one of the caches (sinblk, dinblk, or
                                tinblk), update the saved block number for
                                what is in that cache, since the block moved.

Now go through the indirect block and change the
                                parent block # in all of the blk_descpt_array
                                entries for the child blocks.
                }
```

```
            If( flag == 1 )
            {
                    If this block is in the list of blknos
                            the user wants in this chunk of disk
                    {
                        Update the "desired_blknos" array entry for
                        the block since the block just moved.
                    }
            }
            Else
            {
                If this block's blkno is greater than those in the
                current chunk of disk
                {
                    Change the blk_descpt_array entry for this block
                            to indicate it is now a free block.
                }
            }
        }
        For each tmp_ind_blk          /* Flush caches to disk */
        {
            Call write_tmp_ind_blk( ).
        }
        For each in_memory_inode_blk
        {
            Call write_changed_inode().
        }
} update_inode(inode_no, indx, new_blkno )
{
        Call read_inode( inode_no ).

Use indx to locate correct position within the inode and
            update the block number to new_blkno.

Set flag indicating this particular block of inodes has
            been modified since last written to disk.

If inode_no is same as the one whose block numbers are
            currently unpacked in the unpacked_blknos array
        {
            Set the array entry indicated by indx to new_blkno.
        }
}
```

```
get_blk_numbers_desired_next( max_blknos )
{
/*
        This routine is STATE driven.  The following variables keep track
        of the current state and where we are within the inode and indirect
        block(s) IN BETWEEN calls to this routine!
*/
        state_num               /* Must be zero initially */
        triple_already_read     /* Must be zero initially */
        unpacked_offset
        sinblk_offset
        dinblk_offset
        tinblk_offset Set  num_blks = 0.

While fewer  than  max_blknos  block #'s  have  been given out
        {
            Switch( state_num )
            {
            case 0:
                    Call  read_next_inode().
                    If  there  are  no  more  inodes  in  the  list,
                                return.          /* All Done! */

Set  unpacked_offset     = 0.
                    Set  triple_already_read = 0.
                    Set  state_num = 1.
                    Goto case 1.

case 1:    /* Give out Block Numbers in the inode itself */

Call  get_next_blknos( max_blknos,
                                            unpacked_blknos,
                                            &unpacked_offset, 10 ).

If  num_blks = max_blknos  return.

Call  read_into_an_inblk( sinblk, unpacked_blknos[10],
                                            &sinblk_offset, &sinblkno).
                    Set  state_num = 2.
                    If  num_blks = max_blknos  return.
                    Goto  case 2.

case 2:    /* Give out Block Numbers from the indirect block */

Call  get_next_blknos( max_blknos, sinblk,
                                            &sinblk_offset, Nindir ).

If  num_blks = max_blknos  return.
                    Set  state_num = 3.
                    Goto  case 3.

case 3:    /* Read the double indirect block */

If  unpacked_blknos[11]==0
                    {
                        Set  state_num = 7.
                        Goto case  7.
                    }
                    Call  read_into_an_inblk( dinblk, unpacked_blknos[11],
                                            &dinblk_offset, &dinblkno).
                    Set  state_num = 4.
                    If  num_blks = max_blknos  return.
                    Goto  case  4.
```

```
case 4:      /* Read an indirect block & give out its blkno */

Set blkno = next nonzero block number in dinblk
        If none
        {
            If( triple_already_read )
            {
                    Set  state_num = 6.
                    Goto  case  6.
            }
            Else
            {
                    Set  state_num = 7.
                    Goto  case  7.
            }

}
        Call  read_into_an_inblk( sinblk, blkno ,
                                        &sinblk_offset, &sinblkno).
        Set  state_num = 5.
        If  num_blks = max_blknos  return.
        Goto  case  5.

case 5:      /* Give out Block Numbers from an indirect block */

Call  get_next_blknos( max_blknos, sinblk,
                                        &sinblk_offset, Nindir ).

If  num_blks = max_blknos  return.
        Set  state_num = 4.
        Goto  case  4.

case 6:      /* Read a double indirect block */

Set blkno = next nonzero block number in tinblk.
        If none
        {
            Set state_num = 0.
            Goto  case  0.
        }
        Call  read_into_an_inblk( dinblk, blkno ,
                                        &dinblk_offset, &dinblkno).
        Set  state_num = 4.
        Goto  case  4.

case 7:            /* Read the triple indirect block */
        If  triple_already_read
        {
            Set  state_num = 0.
            Goto  case 0.
        }
        Set  triple_already_read = 1.

Call  read_into_an_inblk( tinblk, unpacked_blknos[12],
                                        &tinblk_offset, &tinblkno).
        Set  state_num = 6.
        Goto  case  6.
    }
}
Return.
}
```

```
get_next_blknos( max_blknos, blk_array, offset_ptr, max_offset )
{
        While  num_blks < max_blknos  AND  not past end of blk_array
        {
                Set  blkno = next blk_array entry.
                Increment offset_ptr ( our current position within blk_array ).
                If  blkno  nonzero
                {
                        Put  blkno in next position in desired_blknos array.
                        Increment  num_blks.
                }
        }
        Return.
} get_destination_blknos( num_blks )
{
        Set  changes_in_chunk = 0.      /* Assume no changes for now */

For  each  block  in  input buffer
        {
                If  this  block  is  a free block
                {
                        Set  destination block # for this block to be same
                                as where the block came from.
                        Set  changes_in_chunk = 1.
                }
                Else  if  this  block  is  what  user  wants  in  this
                        block  of  the disk
                {
                        Set  destination block # for this block to be same
                                as where the block came from.
                }
                Else
                {
                        Set  changes_in_chunk = 1.
                        Search  blk_descpt_array  for  next free block.
                        Set  dest_blknos array entry for this block  to be
                                the block # of that next free block.
                        Set  blk_descpt_array entry for that free block
                                to be same as the blk_descpt_array entry
                                for the block in the input buffer.
                }
        }
        Return.
}
```

```
/*
 * read_blks_desired_next() reads the disk blocks specified in the
 * desired_blknos[] array into the big buffer.  If 2 (or more) consecutive
 * block numbers in the array are also contiguous on disk, then the disk
 * reads are combined into one request.
 */
read_blks_desired_next( num_blks, bufr_addr )
{
    Set  JJJ = 0.

While  JJJ < num_blks
    {
        If  desired_blknos[JJJ] is anywhere in the input buffer
        {
            Copy the block from the input buffer.
            Increment  JJJ by 1.
            Add  size of one block to bufr_addr.
        }
        Else
        {
            Look ahead in desired_blknos array to find
                how many blocks are contiguous.
            Read all the contiguous block with one read operation.
            Increment  JJJ by the number of blocks just read.
            Adjust  bufr_addr  appropriately.
        }
    }
} read_inode( inode_no )
{
    Set  blkno = block # of block of  inodes  with  inode of interest.
    Search curr_inode_blknos array to see if block is in the cache.
    If block is in cache
    {
        Return( address of inode ).
    }
    If there is an inode block in the cache not needing writing to disk
    {
        Select that block of the cache.
    }
    Else
    {
        Select some block of the cache.
        Call  write_changed_inode on that block.
    }
    Set  curr_inode_blknos[ select block ] = blkno.
    Read  the  block  of  inodes  into  the  selected block.
    Return( address of inode ).
}
```

```
read_next_inode()
{
        Set     valid_inode_found = 0.
        While   valid_inode_found = 0
        {
                Set  curr_unpacked_inode_no = next inode # from the inode_list.
                If   no more in list
                {
                        Return( 0 ).
                }
                Call  read_inode( curr_unpacked_inode_no ).
                If   inode is in use
                {
                        If  inode has any non-zero block numbers in it
                        {
                                Set valid_inode_found = 1.
                        }
                }
        }
        Unpack  the  13  block numbers in the inode into the
                unpacked_blknos array.

Return( address of inode ).
} read_into_an_inblk( bufadr, blkno, offset_ptr, blkno_ptr )
{
        Set  block number pointed to by blkno_ptr = blkno.
        If  blkno  is  nonzero
        {
                If  blkno  is  somewhere  in  the  input  buffer
                {
                        Copy block from the input buffer to buffer.
                }
                Else
                {
                        Read  the  block  from  disk  into the buffer.
                }
                Set  offset pointed to by offset_ptr = 0.
                Set  next desired_blknos array entry = blkno.
                Increment  current position  within  desired_blknos array.
        }
        Else
        {
                Set  offset pointed to by offset_ptr  = Nindir.
        }
        Return.
} read_tmp_ind_blk( i_blkno )
{
        If  i_blkno  is  in  tmp_ind_blknos  array   /* If block in cache */
                return( location of block ).
        If  a  cache entry is empty, select the empty cache entry.
        Else
        {
                Select some cache entry.
                Call  write_tmp_ind_blk( selected entry ).
        }
        Read the block from disk into the selected cache entry.
        Set  the tmp_ind_blknos array entry = i_blkno.
        Return( location of block ).
}
```

```
write_changed_inode( location of inode block )
{
        If  inode_blk_changed[this inode block] flag = 1
        {
                Write  inode block to disk.
                Set  inode_blk_changed[this inode block] = 0.
        }
} write_to_destination_blocks( num_blks, bufr_addr )
{
    For  each  block  in  buffer
    {
        If  blk_changed_in_mem[ this block ] = 0  AND the block was
                already on disk where the user wanted it
        {
                Go on to next block in buffer.
        }
        Else
        {
                Look ahead in dest_blknos  array  to  find
                        how many blocks are contiguous.
                Write all the contiguous block with one write operation.
                Go on to next block in buffer after all those written.
        }
    }
} write_tmp_ind_blk( index_of_block_within_cache_of_indirect_blocks )
{
        If  tmp_ind_blknos[ index... ] = 0
        {
                Return.
        }
        Write  indirect block to disk.
        Set  tmp_ind_blknos[ index... ] = 0.
        Return.
} process_cntl_file( filename )
{
        Read the control file, parse the lines, and build the
        list of inode numbers which specifies what order the
        user wants the files to be in when done.

Return.
} initialize( file_system_name )
{
        Validate  file_system_name.
        If  not  valid,  give  error  message.

Check  if  file_system_name  is for  a  mounted  file system.
        If mounted  give error message.

Open  the  raw disk device  for  the file system.
        /*
        ** NOTE: Must use raw disk, because algorithm will not be safe
        **       if using blocked disk.
        */
```

```
        Allocate memory for the superblock.  Align on any boundary
            necessary for raw disk I/O.

Read superblock into memory.
        Set  Blksiz  =  block size corresponding to file system type.

Do any further desired validation of the file system.
        Set  Nindir  =  Number of disk block numbers that can be contained
                        in  one  indirect block.

Allocate memory for sinblk, dinblk, and tinblk.
        Allocate memory for the inode cache.
        Allocate memory for the tmp_ind_blk cache.
        Allocate memory for the input buffer.
        Allocate memory for the output buffer.
        Allocate memory for the blk_descpt_array.
        Allocate memory for the inode_list array.

Set  max_num_blks = minimum( number of free blocks,  MXB ).
        If   max_num_blks <= 0
        {
                max_num_blks = MXB.
        }
        If   max_num_blks < 32   /* Arbitrarily picked absolute minimum */
        {
                Give error message - alogrithm won't be very fast.
        }
        Initialize  inode_list  and  current_inode_no_ptr.
        Set  first_blkno = block number of first data block (past inode blocks
} mapit( blk_type, parent_type, blkno, parent_num, index )
{
        If  blkno  not within range of file system
        {
                Give error message - invalid block number found.
        }
        If  blk_descpt_array entry for this blkno is already in use
        {
                Give error message - dual allocation of block.
        }
        Set  blk_descpt_array[blkno]'s parent    field = parent_num.
        Set  blk_descpt_array[blkno]'s par_type  field = parent_type.
        Set  blk_descpt_array[blkno]'s blk_type  field = blk_type.
        Set  blk_descpt_array[blkno]'s index     field = index.
} build_blk_descriptor_array()
{
        For  each  inode  on  disk
        {
                Call  read_inode( inode_num ).

If  inode  not in use, skip it.
                If  inode  has no block numbers associated with it, skip it.

Add this inode number to the list of inode numbers.
                Search list first, as we may already have it in the list
                from processing the control file specified by the user.
```

```
            Unpack the 13 block numbers in the inode.
            For each block number
            {
                    If block number is nonzero
                    {
                            If one of first 10 block numbers
                            {
                                    Call mapit( DATA_BLK_TYPE,
                                                INODE_PARENT,
                                                blkno, inode_no,
                                                index_into_inode ).
                            }
                            Else
                            {
                                    Call mapit( INDIR_BLK_TYPE,
                                                INODE_PARENT,
                                                blkno, inode_no,
                                                index_into_inode ).
                            }
                    }
                    If this is the 11th block number
                            Call indirect( blkno ).
                    If this is the 12th block number
                            Call doublein( blkno ).
                    If this is the 13th block number
                            Call triplein( blkno ).
            }
    Set yyy = file system size - block number of first data block.
    Set yyy = yyy - number of used blocks.
    Set max_num_blks = minimum( MXB, yyy ).
    If max_num_blks < 32
    {
            Give error message - alogrithm won't be very fast.
    }
} indirect( ind_blkno )
{
        Read the indirect block into sinblk.
        Set sinblkno = ind_blkno.
        For each nonzero block number in the indirect block
        {
                Call mapit( DATA_BLK_TYPE,
                            INDIR_PARENT, blkno, ind_blkno,
                            index_into_indirect_block ).
        }
} doublein( db_ind_blkno )
{
        Read the indirect block into dinblk.
        Set dinblkno = db_ind_blkno.
        For each nonzero block number in the indirect block
        {
                Call mapit( INDIR_BLK_TYPE,
                            INDIR_PARENT, blkno, db_ind_blkno,
                            index_into_indirect_block ).
                Call indirect( block number );
        }
}
```

```
triplein(t_ind_blkno)
{
        Read the indirect block into tinblk.
        Set   tinblkno = t_ind_blkno.
        For   each  nonzero block number in the indirect block
        {
                Call mapit( INDIR_BLK_TYPE,
                            INDIR_PARENT, blkno, t_ind_blkno,
                            index_into_indirect_block ).
                Call doublein( block number );
        }
} cleanup()
{
        Build a new free list for the file system, with all remaining
                blocks in the free list.
        Set up anchor for free list in the superblock.
        Set up number of free blocks in the superblock.
        Write the superblock to disk.
        Terminate.
}
```

What is claimed is:

1. A system for defragmenting a disk film system by arranging each block without gaps and in proper logical order, comprising:
   a storage circuit;
   a first circuitry for reading a first contiguous portion of the disk file system comprising a fragmented plurality of blocks into a first buffer in a storage circuit, and wherein said first contiguous portion has a size of n blocks, and wherein n is an integer;
   a second circuitry for writing said fragmented plurality of blocks from said first buffer into a free space in the disk file system;
   a third circuitry for continuous placing a second plurality of n blocks into a second buffer in the storage circuit; and
   a fourth circuitry for contiguously writing said second plurality of blocks from said second buffer into said first contiguous portion of the disk file system without leaving gaps of said free space between adjacent blocks and in proper logical order, thereby writing said n blocks into said first contiguous portion of the disk file system,
   wherein said system further comprises:
      a plurality of file system control structures, each of which is associated with a block, comprises a pointer to said block, and having a location;
      circuitry for creating a block descriptor array comprising data describing the location of said file system control structure for each block in the disk file system;
      circuitry for storing said block descriptor array; and
      circuitry for updating said block descriptor array during the defragmentation process as the locations of said blocks are changed,
      wherein said system further comprises circuitry for changing values of pointers of said file system control structures associated with blocks which are moved during the defragmentation process,
      wherein said circuitry for changing comprises inode cache circuitry for storing inodes having multiple pointers to be changed during the defragmentation of the disk file system such that said multiple pointers are adapted to be changed in said inode cache circuitry and wherein said inodes are adapted to be updated in said disk file system using a single write operation for each block of said inodes.

2. A system for defragmenting a disk film system by arranging each block without gaps and in proper logical order, comprising:
   a storage circuit;
   a first circuitry for reading a first contiguous portion of the disk file system comprising a fragmented plurality of blocks into a first buffer in a storage circuit, and wherein said first contiguous portion has a size of n blocks, and wherein n is an integer;
   a second circuitry for writing said fragmented plurality of blocks from said first buffer into a free space in the disk file system;
   a third circuitry for continuous placing a second plurality of n blocks into a second buffer in the storage circuit; and
   a fourth circuitry for contiguously writing said second plurality of blocks from said second buffer into said first contiguous portion of the disk file system without leaving gaps of said free space between adjacent blocks and in proper logical order, thereby writing said n blocks into said first contiguous portion of the disk file system,
   wherein said system further comprises:
      a plurality of file system control structures, each of which is associated with a block, comprises a pointer to said block, and having a location;
      circuitry for creating a block descriptor array comprising data describing the location of said file system control structure for each block in the disk file system;
      circuitry for storing said block descriptor array; and
      circuitry for updating said block descriptor array during the defragmentation process as the locations of said blocks are changed,
      wherein said system further comprises circuitry for changing values of pointers of said file system control structures associated with blocks which are moved during the defragmentation process,
      wherein said circuitry for changing comprises indirect cache circuitry for storing indirect blocks having multiple pointers to be changed during the defragmentation of the disk file system such that said multiple pointers are adapted to be changed in said indirect cache circuitry and wherein said indirect blocks are adapted to be updated in said disk file system using a single write operation per one of said indirect blocks.

3. A system for defragmenting a disk file system by arranging each block without gaps and improper logical order wherein each file of said disk file system corresponds to a file system control structure having a pointer to each block contained within said each file, comprising:
   a storage circuit;
   circuitry for sequentially reading into the storage circuit a plurality of contiguous portions containing n blocks of the disk file system, each of said contiguous portion comprising a fragmented plurality of blocks;
   circuitry for writing each of said fragmented plurality of blocks into a free space in the disk file system;
   circuitry for contiguous placing selected pluralities of blocks in each of said contiguous portions of the disk file system into the storage circuit;
   circuitry for contiguously writing each of said selected pluralities of blocks into each of said plurality of contiguous portions of the disk file system without gaps of said free space between said blocks and in proper logical order, respectively;
   circuitry for creating a block descriptor array comprising data describing a location of the file system control structure for each file in the disk file system;
   circuitry for storing said block descriptor array;
   circuitry for updating said block descriptor array during the degragmentation process as locations of said blocks are changed; and
   circuitry for changing values of pointers associated with blocks moved during the defragmentation process,
   wherein said circuitry for changing comprises inode cache circuitry for storing inodes having multiple pointers to be changed during the defragmentation of the disk file system such that said multiple pointers are adapted to be changed in said inode cache circuitry and wherein said inodes are adapted to be updated in said disk file system using a single write operation per each block of said inodes.

4. A system for defragmenting a disk file system by arranging each block without gaps and improper logical order wherein each file of said disk file system corresponds to a file system control structure having a pointer to each block contained within said each file, comprising:
- a storage circuit;
- circuitry for sequentially reading into the storage circuit a plurality of contiguous portions containing n blocks of the disk file system, each of said contiguous portion comprising a fragmented plurality of blocks;
- circuitry for writing each of said fragmented plurality of blocks into a free space in the disk file system;
- circuitry for contiguous placing selected pluralities of blocks in each of said contiguous portions of the disk file system into the storage circuit;
- circuitry for contiguously writing each of said selected pluralities of blocks into each of said plurality of contiguous portions of the disk file system without gaps of said free space between said blocks and in proper logical order, respectively;
- circuitry for creating a block descriptor array comprising data describing a location of the file system control structure for each file in the disk file system;
- circuitry for storing said block descriptor array;
- circuitry for updating said block descriptor array during the degragmentation process as locations of said blocks are changed; and
- circuitry for changing values of pointers associated with blocks moved during the defragmentation process,
- wherein said circuitry for changing comprises indirect cache circuitry for storing indirect blocks having multiple pointers to be changed during the defragmentation of the disk file system such that said multiple pointers are adapted to be changed in said indirect cache circuitry and said indirect blocks are adapted to be updated in said disk file system using a single write operation per one of said indirect blocks.

5. A computerized method for degragmenting a disk file system by arranging each block without gaps and in proper logical order, comprising the steps of:
- reading a first contiguous portion of the disk file system comprising a fragmented plurality of blocks into a storage circuit, and wherein said first contiguous portion stores n blocks;
- writing contiguously the fragmented plurality of blocks into a free space in the disk file system;
- contiguous placing in the disk file system a second plurality of blocks in the storage circuit of n blocks from the disk file system;
- writing the second plurality of blocks into the first contiguous portion of the file system, without gaps of said free space between blocks and in proper logical order,
- wherein said method further comprises the step of:
  - changing the values of pointers associated with blocks which are moved during the defragmentation of the disk file system;
  - wherein said step of changing comprises the steps of:
    - storing inodes having multiple pointers to be changed during the defragmentation of the disk file system in an inode cache circuit; and
    - changing the multiple pointers in the inode cache circuit such that the inodes are adapted to be updated in the disk file system using a single write operation per each block of inodes.

6. A computerized method for degragmenting a disk file system by arranging each block without gaps and in proper logical order, comprising the steps of:
- reading a first contiguous portion of the disk file system comprising a fragmented plurality of blocks into a storage circuit, and wherein said first contiguous portion stores n blocks;
- writing contiguously the fragmented plurality of blocks into a free space in the disk file system;
- contiguous placing in the disk file system a second plurality of blocks in the storage circuit of n blocks from the disk file system;
- writing the second plurality of blocks into the first contiguous portion of the file system, without gaps of said free space between blocks and in proper logical order,
- wherein said method further comprises the step of:
  - changing the values of pointers associated with blocks which are moved during the defragmentation of the disk file system;
  - wherein said step of changing comprises the steps of:
    - storing indirect blocks having multiple pointers to be changed during the defragmentation of the disk file system in a indirect cache circuit; and
    - changing the multiple pointers in the indirect cache circuit such that the indirect blocks are adapted to be updated in the file system using a single write operation per one of the indirect blocks.

7. A method for defragmenting a disk file system by arranging each block without gaps and in proper logical order, comprising the steps of:
- creating a block descriptor array comprising data describing the location of a pointer to each block in the disk file system,
- storing the block descriptor array
- reading sequentially a plurality of contiguous portions of the disk file system into a storage circuit, each of the plurality of contiguous portions comprising a fragmented plurality of blocks, wherein each contiguous portion is adapted for storing n blocks;
- writing each of the fragmented plurality of blocks into a free space in the disk file system;
- reading selected pluralities of blocks into the storage circuit and contiguous placing the selected pluralities of blocks in each of the contiguous portions of the disk file system;
- writing contiguously each of the selected pluralities of blocks into each of the plurality of contiguous portions of the disk file system, respectively, without introducing gaps of said free space between said blocks and in proper logical order;
- updating the block descriptor array during the defragmentation process as the locations of the blocks change; and
- changing values of pointers associated with blocks moved during the defragmentation process;
- wherein said step of changing comprises the steps of:
  - storing inodes having multiple pointers to be changed during the defragmentation of the disk file system in an inode cache circuit; and
  - changing the multiple pointers in the inode cache circuit such that the inodes are adapted to be updated in the disk file system using a single write operation per one of the inodes.

8. A method for defragmenting a disk file system by arranging each block without gaps and in proper logical order, comprising the steps of:

creating a block descriptor array comprising data describing the location of a pointer to each block in the disk file system, storing the block descriptor array reading sequentially a plurality of contiguous portions of the disk file system into a storage circuit, each of the plurality of contiguous portions comprising a fragmented plurality of blocks, wherein each contiguous portion is adapted for storing n blocks;

writing each of the fragmented plurality of blocks into a free space in the disk file system;

reading selected pluralities of blocks into the storage circuit and contiguous placing the selected pluralities of blocks in each of the contiguous portions of the disk file system;

writing contiguously each of the selected pluralities of blocks into each of the plurality of contiguous portions of the disk file system, respectively, without introducing gaps of said free space between said blocks and in proper logical order;

updating the block descriptor array during the defragmentation process as the locations of the blocks change; and changing values of pointers associated with blocks moved during the defragmentation process;

wherein said step of changing comprises the steps of:
 storing indirect blocks having multiple pointers to be changed during the defragmentation of the disk file system in an indirect cache circuit; and
 changing the multiple pointers in the indirect cache circuit such that the indirect blocks are adapted to be updated in the file system using a single write operation per block of the indirect blocks.

* * * * *